May 11, 1965

W. O. MIESSNER 3,183,004

RECORD PLAYER INDICATOR

Filed May 31, 1962

INVENTOR.

William Otto Miessner

BY Wallenstein, Spangenberg & Hattis

Attys.

United States Patent Office
3,183,004
Patented May 11, 1965

3,183,004
RECORD PLAYER INDICATOR
William Otto Miessner, 522 Eastern Ave., Connersville, Ind.
Filed May 31, 1962, Ser. No. 198,848
7 Claims. (Cl. 274—1)

This invention relates to an indicator for a record player, and in particular, to an indicator which can be employed in connection with a record player of the present day type equipped with a tone arm provided at the underside of its free end with a short and delicate stylus.

Various devices have heretofore been developed to enable users of record players to locate accurately a desired portion of a disc recording for replaying, thereby eliminating the necessity for listening to portions of the recording not of immediate interest to the listener. The convenience of such devices and the concomitant savings in time resulting from their utilization have made them valuable accessories to record playing apparatus. However, such devices have had a number of disadvantages including the fact that, in certain instances, they cannot be adapted to present day record players and, in other instances, the fact that they are complex in construction and constitute a substantial investment on the part of the user.

It is an object of this invention to provide an indicator for a record player which is free from the foregoing disadvantages, and which can be utilized in connection with substantially any of the present day record players.

It is also an object of this invention to provide an indicator for a record player which is simple in construction, convenient to use, and well within the means of any record player user.

It is another object of this invention to provide an indicator for a record player which enables the user to quickly and accurately locate a pre-selected portion of a disc recording for replaying as often as desired.

In accordance with the present invention, the record player indicator includes a lightweight fixture which is adapted to be attached to the free end of the tone arm of a record player, and a cooperating slotted indicator strip which is adapted to be received by the post or spindle in the turntable of a record player and which is supported by and coacts with the fixture to permit the user to selectively control disc recorded subject matter. Portions of the fixture advantageously are shaped to correspond to the contours of the free end of the record player tone arm to enable the fixture to be easily, readily and securely attached thereto. The fixture has an upwardly extending handle portion to facilitate manipulation of the tone arm, and a horizontal, indicator strip supporting portion adapted to be spaced just above the record disc on the turntable of the record player. An upwardly extending pointer portion is provided on the horizontal portion of the fixture.

The cooperating indicator strip preferably has spaced spindle receiving openings to enable the indicator to be utilized in connection with different size record discs, for instance, ten inch and twelve inch record discs. The strip is provided with an elongated slot which traverses the area of the record disc occupied by the spiral record groove of the disc, and which receives the pointer portion of the fixture. Suitable indicia are provided along the slot of the strip which, in cooperation with the pointer portion of the fixture, precisely indicate the position of the stylus on the tone arm with relation to the spiral record groove. In its operative position a portion of the strip slidably rests on the horizontal portion of the fixture where it is held above the record disc thereby preventing the strip from rubbing against the disc, thus eliminating a source of possible damage to the spiral record groove of the disc.

The above and other advantages and features of the present invention will become apparent upon making reference to the specification to follow, the claims, and the drawing wherein:

Figure 1:
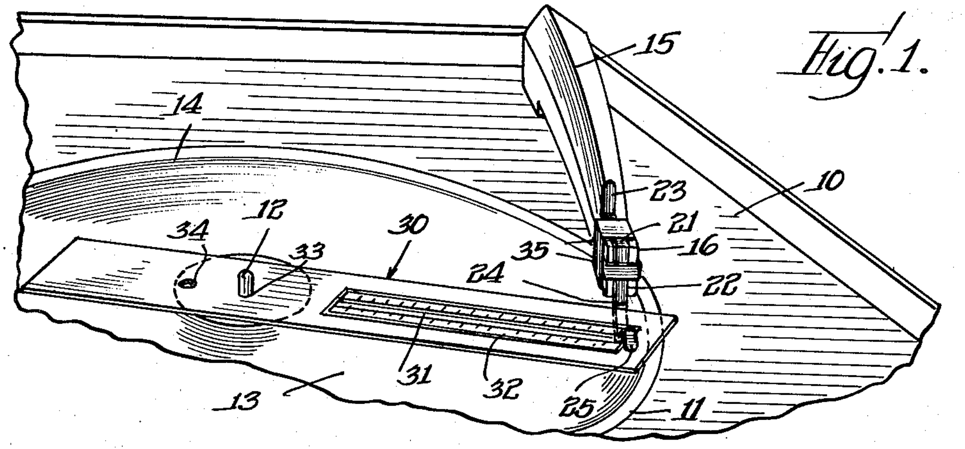
FIG. 1 is a fragmentary view in perspective of a record player with an embodiment of the indicator of this invention positioned thereon.
Figures 2, 3:
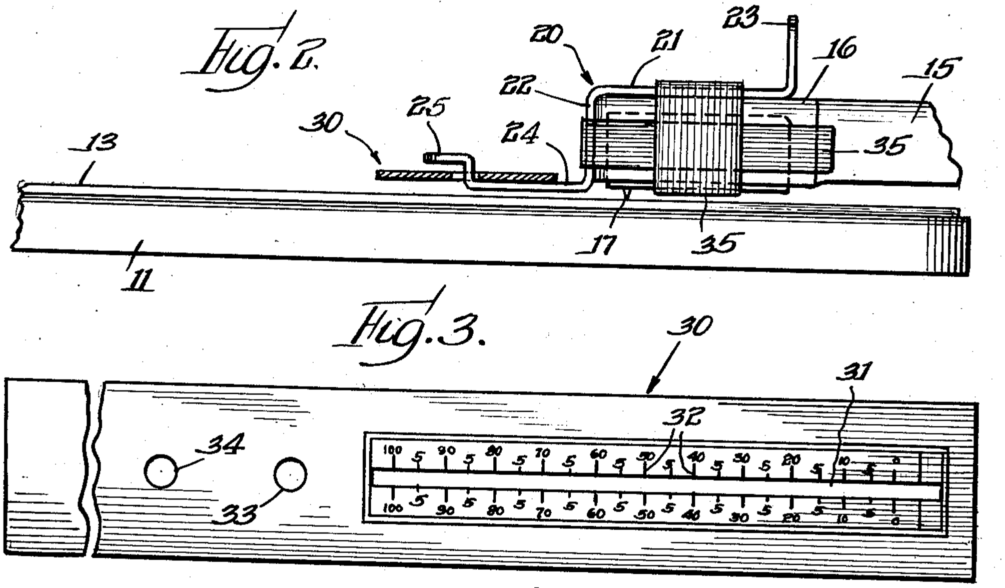
FIG. 2 is an enlarged fragmentary elevational side view partly in section looking from the right of FIG. 1 and illustrating said embodiment of the indicator of this invention and the relationship of the cooperating elements thereof with respect to the tone arm of a record player and a record disc on the turntable thereof.
FIG. 3 is a fragmentary top plan view of the indicator strip of said embodiment of the indicator of this invention.

Referring now in particular to FIGS. 1 and 2 of the drawing, there is illustrated a present day record player including a housing or cabinet 10 having a turntable 11 rotatably mounted thereon. The turntable 11 is provided with a post or spindle 12 for receiving a record disc 13 having a spiral record groove 14. A tone arm 15 is pivotally mounted on the cabinet 10 and is provided adjacent its free end 16 at the underside thereof with a short delicate stylus 17 adapted to be received in the spiral record groove 14 of the record disc 13. The portions of the record player thus far described are of conventional present day construction and it is to be understood that standard driving mechanism and sound reproduction means may be associated therewith to produce the desired result.

Figures 4, 5:
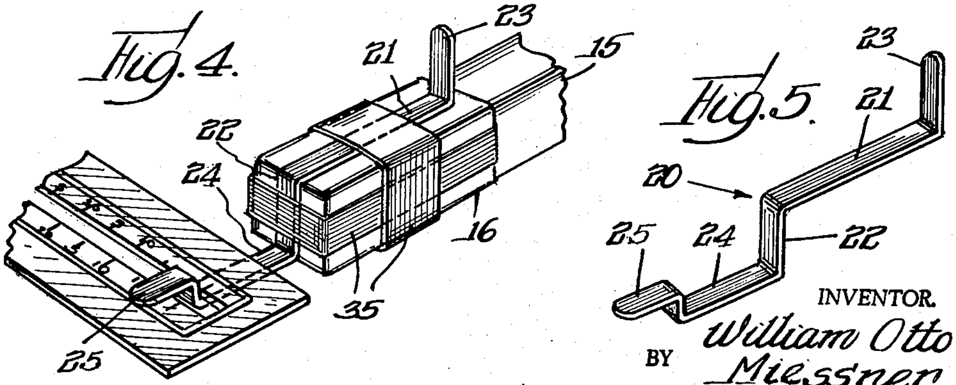
FIG. 4 is a fragmentary view in perspective of said embodiment of the indicator of this invention illustrating the relationship of the elements thereof in their operative position.
FIG. 5 is a view in perspective of the tone arm engaging fixture of said embodiment of the indicator of the present invention.

Referring now to FIGS. 2, 4 and 5 of the drawing, the objectives of the present invention are achieved by attaching to the free end 16 of the tone arm 15 a fixture 20 which may be fabricated of any suitable material such as metal, plastic, and the like. Preferably, the material should be light in weight and the dimensions of the fixture 20 should be such that no appreciable load is placed on the tone arm 15 thereby. In the preferred embodiment illustrated in the drawings, the fixture 20 is formed of aluminum strip stock and has an overall length of approximately three inches, more or less.

The fixture 20 advantageously has a horizontal portion 21 and a downwardly extending portion 22 shaped to correspond substantially to the contours of the top and end surfaces of the free end 16 of the tone arm 15. Joined to the horizontal portion 21 is an upwardly extending handle portion 23, the function of which will be made clear as the description proceeds. The downwardly extending portion 22 of the fixture 20 is joined to a horizontal indicator strip supporting portion 24 which in turn desirably joins an upwardly extending pointer portion 25.

Cooperating and coacting with the fixture 20 is an elongated, substantially rectangular indicator strip 30 which may be fabricated of a rigid or semi-rigid material such as plastic, cardboard, and the like. The strip 30 advantageously is formed with an elongated, longitudinally extending slot 31 for receiving the indicator portion 25 of the fixture 20. Indicia 32 are provided along the slot 31 for indicating the position of the stylus 17 of the record player with respect to the record groove 14 on the record disc 13. The indicia 32 may be placed on the strip 30 in any manner known in the art, and especially desirably may be complemented by Braille characters to enable those afflicted with a visual impairment to effectively utilize the indicator.

In the embodiment illustrated, the strip 30 is provided with holes 33 and 34 for receiving the spindle 12 on the turntable 11. The holes are properly spaced to permit the indicator to be used in connection with different sized record discs. The hole 33, for instance, is adapted for use with 10 inch discs, and the hole 34 is used when 12 inch discs are placed on the turntable.

In utilizing the present invention, the fixture 20 is attached or secured to the free or head end 16 of the tone arm 15 by any suitable means. This may be conveniently accomplished, for example, by positioning the fixture 20 on the free end 16 of the tone arm 15 so that the downwardly extending portion 22 of the fixture abuts the end surface of the free end of the tone arm, and the horizontal portion 21 of the fixture rests on the upper surface thereof. A suitable pressure sensitive adhesive tape 35 may then be employed to rigidly secure the portions 21 and 22 of the fixture 20 to the free end 16 of the tone arm 15, as illustrated. While it is to be understood that means other than tape may be used to attach the fixture to the free end of the tone arm, and that the present invention is not limited to the use of tape as a fastening means, utilization thereof for the indicated purpose is preferred not only from the standpoint of its ready availability, but more importantly, from the standpoint that the use of such a material enables the user of the indicator to adjust the pointer portion of the fixture so that it is accurately aligned with the zero or base marking of the indicia on the indicator strip. This important initial adjustment operation permits the attainment of precise logging of the recorded material on a record disc.

Having secured the fixture to the tone arm, the record disc 13 is placed on the turntable 11, and the indicator strip 30 placed thereover by inserting the spindle 17 through one of the holes 33 or 34, the choice of hole being dependent upon the size of the record disc 13. The holes 33 and 34 advantageously are provided with grommets (not shown), or other suitable means, for holding a portion, at least, of the strip 30 in an elevated position above the record disc 13. The strip 30 may then be placed in operative relation with respect to the fixture 20 by inserting the pointer portion 25 thereof through the slot 31 of the strip 30. This has the effect of causing a portion of the strip 30 to rest in slidable relation on the horizontal portion 24 of the fixture 20. The fixture 20, due to its shape and its position on the tone arm, maintains in conjunction with the grommets in the holes 33 and 34, the strip 30 in an elevated position with respect to the disc 13 thereby preventing any damage to the spiral groove 14 thereof that would otherwise be caused if the strip was permitted to rub against the disc.

Through the conjoint action of the pointer portion 25 of the fixture 20, and the strip 30 and the indicia 32 along the slot 31 thereof, it is possible to log all portions of a record disc. This may be achieved by merely observing and recording in a notebook or the like, the degree numbers indicated by the pointer portion 25 at the beginning and finish of a desired segment of a recording. Thereafter, the listener can quickly and precisely preselect any portion of the recording for repeat playing. The handle portion 23 of the fixture 20 effectively and efficiently permits the listener to manipulate the tone arm 15 to position the stylus 17 on any desired segment of the spiral record groove 14.

After all portions of a recording have been logged in the manner described, a guide or chart may be prepared identifying, and even describing, if desired, each portion of the recorded subject matter to thus enable a listener to anticipate and recognize the various portions as they are played. Such information contributes immeasurably to the interest, enjoyment, and edification of the listener and makes possible a fuller understanding and deeper appreciation of the recording.

While a specific embodiment of the invention has been illustrated and described, it is to be understood that many modifications are possible without departing from the spirit and scope of the invention.

What is claimed as new and desired to be protected by Letters Patent of the United States is:

1. An indicator for a record player having a rotatable turntable provided with a spindle, a record disc on the turntable provided with a spiral record groove and rotatable about the spindle, and a tone arm provided adjacent its free end with a stylus adapted to be received in the spiral record groove in the record disc, comprising, a fixture secured to the free end of the tone arm and having a horizontal portion spaced just above the record disc and an upwardly extending pointer portion, and an indicator strip supported above the record disc by the horizontal portion of the fixture and having a hole for receiving the spindle and an elongated slot receiving the pointer portion of the fixture for positioning the indicator strip with respect to the record disc, said indicator strip having indicia along the elongated slot therein and cooperating with the pointer portion of the fixture for indicating the position of the stylus with respect to the spiral record groove.

2. An indicator for a record player having a rotatable turntable provided with a spindle, a record disc on the turntable provided with a spiral record groove and rotatable about the spindle, and a tone arm provided adjacent its free end with a stylus adapted to be received in the spiral record groove in the record disc, comprising, a fixture removably secured to the free end of the tone arm and having an upwardly extending handle portion, a horizontal portion spaced just above the record disc, and an upwardly extending pointer portion, and a cooperating indicator strip supported above the disc by the horizontal portion of the fixture and having a hole for receiving the spindle and an elongated slot receiving the pointer portion of the fixture for positioning the indicator strip with respect to the record disc, said indicator strip having indicia along the elongated slot therein and cooperating with the pointer portion of the fixture for indicating the position of the stylus with respect to the spiral record groove, said handle portion of the fixture providing means for manipulating the tone arm.

3. An indicator for a record player having a rotatable turntable provided with a spindle, a record disc on the turntable provided with a spiral record groove and rotatable about the spindle, and a tone arm provided adjacent its free end with a stylus adapted to be received in the spiral record groove in the record disc, comprising a fixture, portions of which are shaped to substantially correspond to the contours of the free end of the tone arm to permit the fixture to be securely attached thereto, said fixture further having an upwardly extending handle portion, a horizontal portion spaced just above the record disc, and an upwardly extending pointer portion, and a cooperating indicator strip supported above the disc by the horizontal portion of the fixture and having a hole for receiving the spindle and an elongated slot receiving the pointer portion of the fixture for positioning the indicator strip in position with respect to the record disc, said indicator strip having indicia along the elongated slot therein and cooperating with the pointer portion of the fixture for indicating the position of the stylus with respect to the spiral record groove, said handle portion of the fixture providing means for manipulating the tone arm.

4. An indicator for a record player having a rotatable turntable provided with a spindle, a record disc on the turntable provided with a spiral record groove and rotatable about the spindle, and a tone arm provided adjacent its free end with a stylus adapted to be received in the spiral record groove in the record disc, comprising, a lightweight, one-piece fixture portions of which are shaped to substantially correspond to the contours of the free end of the tone arm to permit the fixture to be securely attached thereto, said fixture further having an upwardly extending handle portion, a horizontal portion spaced just above the record disc, and an upwardly extending pointer portion, and a cooperating elongated indicator strip supported above the disc by the horizontal portion of the fixture and having openings for receiving the spindle and an elongated slot, traversing the area on the record disc occupied by the spiral record groove, for receiving the pointer portion of the fixture for positioning the indicator strip in spaced relation with respect to the record disc, said indicator strip having indica along the elongated slot therein and cooperating with the pointer portion of the fixture for indicating the position of the stylus with respect to the spiral record groove, said handle portion of the fixture providing means for manipulating the tone arm.

5. An indicator for a record player having a rotatable turntable provided with a spindle, a record disc on the turntable provided with a spiral record groove and rotatable about the spindle, and a tone arm provided adjacent its free end with a stylus adapted to be received in the spiral record groove in the record disc, comprising, a one-piece aluminum strip portions of which are shaped to substantially correspond to the contours of the free end of the tone arm to permit the strip to be securely attached thereto, said strip further having an upwardly extending handle portion, a horizontal portion spaced just above the record disc, and an upwardly extending pointer portion, and a cooperating elongated, substantially rectangular plastic indicator card supported above the disc by the horizontal portion of the strip and having openings for receiving the spindle and an elongated slot, traversing the area on the record disc occupied by the spiral record groove, for receiving the pointer portion of the strip for positioning the indicator card in spaced relation with respect to the record disc, said indicator card having indicia along the elongated slot therein and cooperating with the pointer portion of the strip for indicating the position of the stylus with respect to the spiral record groove, said handle portion of the strip providing means for manipulating the tone arm.

6. An indicator for a record player having a rotatable turntable provided with a spindle, a record disc on the turntable provided with a spiral record groove and rotatable about the spindle, and a tone arm provided adjacent its free end with a stylus adapted to be received in the spiral record groove in the record disc, comprising, a fixture for engaging with the free end of the tone arm having a horizontal portion spaced just above the record disc and an upwardly extending pointer portion, means for adjustably attaching the fixture to the free end of the tone arm, and a cooperating indicator strip supported above the record disc by the horizontal portion of the fixture and having a hole for receiving the spindle and an elongated slot receiving the pointer portion of the fixture for positioning the indicator strip with respect to the record disc, said indicator strip having indicia along the elongated slot therein and cooperating with the pointer portion of the fixture for indicating the position of the stylus with respect to the spiral record groove.

7. An indicator for a record player having a rotatable turntable provided with a spindle, a record disc on the turntable provided with a spiral record groove and rotatable about the spindle, and a tone arm provided adjacent its free end with a stylus adapted to be received in the spiral record groove in the record disc, comprising, a fixture for engaging with the free end of the tone arm having portions which are shaped to substantially correspond to the contours thereof, said fixture further having an upwardly extending handle portion, a horizontal portion spaced just above the record disc, and an upwardly extending pointer portion, pressure sensitive tape for adjustably attaching the fixture to the free end of the tone arm, and a cooperating indicator strip supported above the record disc by the horizontal portion of the fixture and having a hole for receiving the spindle and an elongated slot receiving the pointer portion of the fixture for positioning the indicator strip with respect to the record disc, said indicator strip having indicia along the elongated slot therein and cooperating with the pointer portion of the fixture for indicating the position of the stylus with respect to the spiral record groove, said handle portion of the fixture providing means for manipulating the tone arm.

References Cited in the file of this patent

UNITED STATES PATENTS 1,688,824 Miessner ---------------- Oct. 23, 1928
2,977,125 Mallina ---------------- Mar. 20, 1961